May 22, 1923.
A. RICKENBACKER ET AL
COUPLING
Filed July 21, 1921
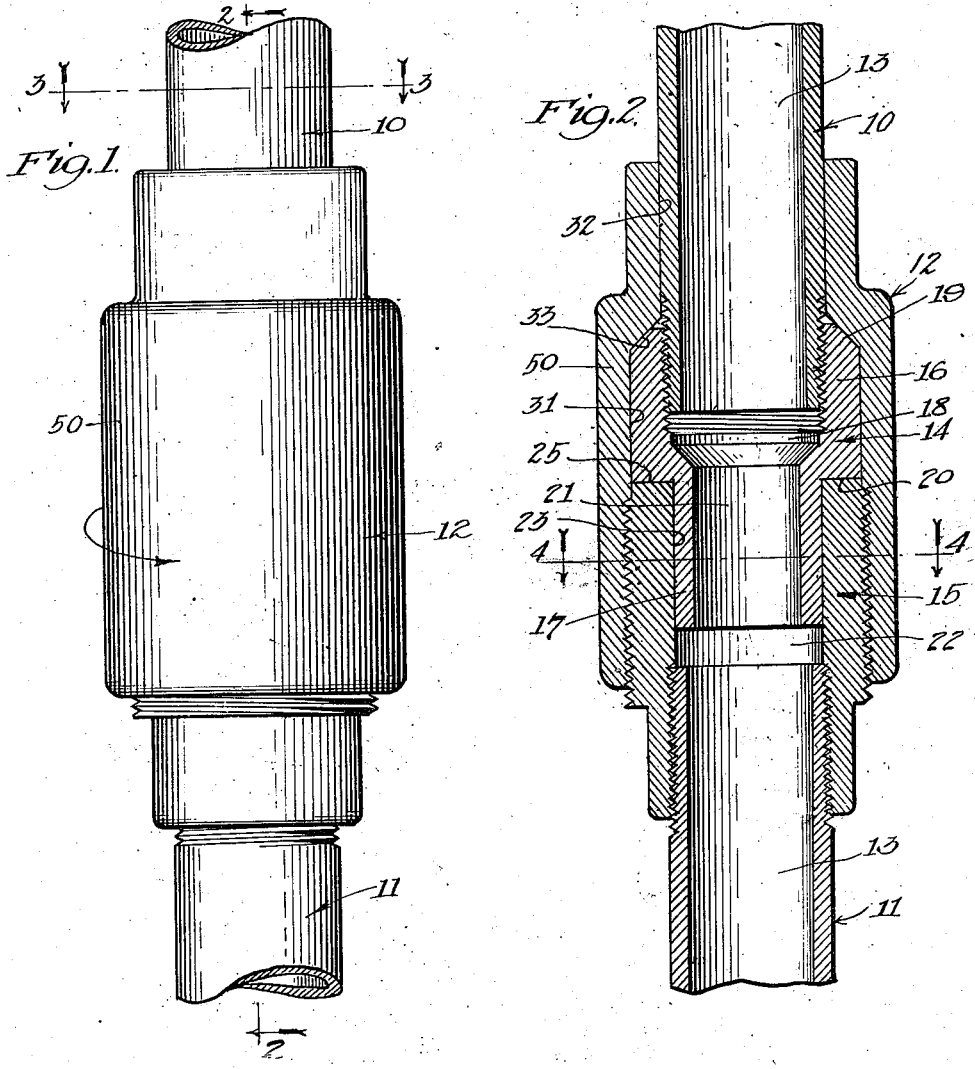
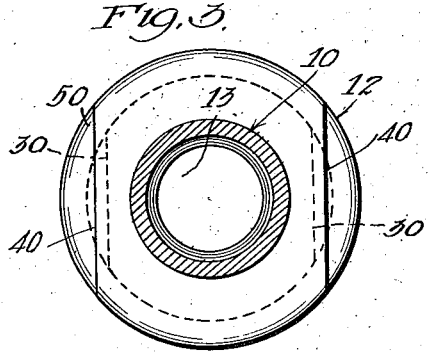
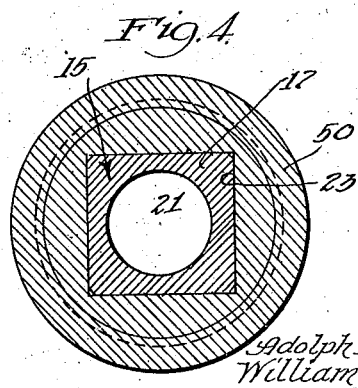
Inventors:
Adolph Rickenbacker
William Kammerer
By James T. Barkelew
Their Attorneys Patented May 22, 1923.

1,455,971

UNITED STATES PATENT OFFICE.

ADOLPH RICKENBACKER AND WILLIAM KAMMERER, OF LOS ANGELES, CALIFORNIA.

COUPLING.

Application filed July 21, 1921. Serial No. 486,480.

*To all whom it may concern:*

Be it known that we, ADOLPH RICKENBACKER and WILLIAM KAMMERER, citizens of the United States, residing at Los Angeles, in the county of Los Angeles and State of California, have invented new and useful Improvements in Couplings, of which the following is a specification.

This invention has to do with a coupling for tubing, rods, and the like, and it is an object of the invention to provide a simple, effective, improved device of this character.

In this disclosure we refer to the invention as applied to a drill stem of a well drilling apparatus as it is particularly adapted for such application it being understood, however, that it may be applied to sucker rods, casings, or in fact, any members of this general character.

It is an object of the invention to provide a coupling which is secure and which forms a positive driving connection. The present coupling will secure two members together so that one of them can be driven or rotated from the other and tends to become tighter and more secure when in operation. The fact that the coupling tends to become tighter and more secure when in operation is an important feature in that it obviates all possibility of the coupling working loose and allowing the members to become separated.

A distinctive feature of the present invention is the provision of a coupling which can be easily and quickly arranged to form a driving connection between two members without necessitating manipulation of either of the members. This feature is particularly desirable in connection with well drilling and pumping apparatus where the members being connected are cumbersome and heavy and are difficult to manipulate and turn.

The various objects and features of the invention will be best and more fully understood from the following detailed description of a typical embodiment of the invention throughout which reference is had to the accompanying drawings in which:—

Fig. 1 is a side elevation of the coupling arranged to connect two adjacent drill stem sections; Fig. 2 is a vertical detail sectional view of the parts shown in Fig. 1 being a view taken as indicated by line 2—2 on Fig. 1; Fig. 3 is a transverse sectional view taken as indicated by line 3—3 on Fig. 1; and Fig. 4 is a transverse sectional view taken as indicated by line 4—4 on Fig. 2.

Throughout the drawings numerals 10 and 11 designate adjacent drill stem sections connected by the coupling 12 provided by the present invention. The drill stem sections, illustrated in the drawings as typical drill stem sections, are tubular members having longitudinal openings 13 extending through them and having their end portions externally screw threaded.

The coupling 12 provided by the present invention comprises, generally, a lug part 14 adapted to be secured to the end of one of the drill stem sections, a socket part 15 adapted to be secured to the end of the other drill stem section and to co-operate with the lug part 14, and a sleeve 50 which co-operates with the lug and socket parts to connect and hold them together in co-operative relation. The lug part 14, in accordance with the preferred form of the invention, comprises a round inner portion 16 and a lug 17 extending from the inner portion 16. The inner portion 16 is round in cross sectional configuration and is formed with a central longitudinal opening 18. Threads are formed in the wall of the opening 18, so that the lug part 14 can be screw threaded onto the end portion of a drill stem section in the manner clearly shown in Fig. 2. The inner end 19 of the lug part 14 is preferably tapered to form a tapered shoulder as shown in Fig. 2 while the shoulder 20 formed between the inner portion 16 and the lug 17 is square, or truly transverse to the longitudinal axis of the lug part. The lug 17, which is somewhat smaller than the inner portion 16, extends from the shoulder 20. The lug 17 is arranged concentrically with the inner portion 16, is polygonal in cross sectional configuration, preferably square, and is provided with a central longitudinal opening 21 which forms a continuation of the opening 18 in the inner portion 16.

The socket part 15 is provided at its outer end portion with a round opening 22, and at its inner end portion with a polygonal opening 23. The openings 22 and 23 join each other at the middle portion of the socket part and together form an opening which extends completely longitudinally through the socket part. The outer portion of the socket part is internally screw threaded, that is threads are found in the wall of the opening 22, to receive the end portion of a drill stem section. The polygonal opening, 23 which we will hereinafter term the socket, corresponds in configuration to the lug 17 and is sufficiently large to just slidably receive the lug 17. The socket 23 is sufficiently long to carry the whole of the lug 17 when the shoulder 20 is in engagement with the end 25 of the socket part 15. In accordance with the invention the inner end portion of the socket part 15 is externally screw threaded while the outer end portion is formed with oppositely disposed flat sides 30 suitable for being engaged by a wrench.

The sleeve 50 is a cylindrical member having an opening 31 extending into it from one end and an opening 32 extending into it from the other end. The opening 32 is somewhat smaller than the opening 31 and where it joins the opening 31 forms a shoulder 33 which is preferably tapered to correspond to the bevel or taper of the end 19 of the lug part. The opening 31 is sufficiently large to slidably receive the lug part 14 and its outer part is internally screw threaded so that it will receive and cooperate with the screw threaded inner portion of the socket part 15 in the manner illustrated in Fig. 2. The opening 32 in the sleeve 50 is just sufficiently large to slidably receive a drill stem section and is arranged on the drill stem section which carries the lug part 14 so that the lug part is in the inner portion of the opening 31 as illustrated in Fig. 2.

In accordance with the invention the threads on the ends of the drill stem section are the same, that is, are both left handed or right handed (in the device shown in the drawings they are both right handed), so that the threads in the lug part 14 and in the socket part 13 are likewise the same, or are right handed. With this formation rotation of the drill stem section 10 in a clockwise direction as indicated by the arrow in Fig. 1 will cause its end portion to screw thread or tighten into the lug part 14, and, when the lug 17 is in place in the socket 23, will cause the socket part 15 to screw thread or tighten onto the drill stem section 11. The threads on the socket part 15 and in the opening 31 are, however, opposite to those of the drill stem section, or are left handed. Rotation of the sleeve 50 in the direction indicated by the arrow in Fig. 1, or, the holding of the collar 16 when the drill stem section is rotated in the direction indicated by the arrow in Fig. 1, will cause it to screw thread onto the socket part 15 and will clamp the shoulder 20 and end 23 together with the lug 17 in operative position in the socket 23. The clamping of the parts 14 and 15 together is due to the end 19 of the lug part 14 being engaged by the shoulder 33 in the sleeve 50. The end 19 of the lug part 14 being inclined or tapered to correspond with the shoulder 33 wedges into the opening in the sleeve and tends to hold the collar against rotation when it is once properly tight in place.

To connect two drill stem sections together with the coupling provided by the present invention the sleeve 50 is slid onto the end portion of one of the sections, the lug part 14 is screw threaded onto the end of that drill stem section, and the socket part 15 is screw threaded onto the end of the other drill stem section. In screw threading the lug part 14 onto a drill stem section a wrench may be applied to the lug 17. When the parts 14 and 15 are properly and securely in place the drill stem sections may be moved longitudinally together until the lug 17 is in place in the socket 23. When the lug is in place in the socket the sleeve 50 can be slid over the lug part 14 and screw-threaded onto the socket part 15. A portion of the sleeve may be provided with oppositely disposed flat sides 40 for the reception of a wrench. When the sleeve has been tightened onto the socket part 15 the parts 14 and 15 are securely held together in operative relation and the joint is ready for operation. During operation the rotation of the drill stem section 10 is communicated to the drill stem section 11 through the parts 14 and 15 due to the co-operation of the lug 17 and socket 23 and the two drill stem sections are held together with the lug 17 in cooperative relation with the socket 23 by the sleeve 50. When the drill stem section 10 is rotated in the direction indicated by the arrow in Fig. 1 it tends to tighten in the lug part 14 and the socket part 15 tends to tighten on the drill stem section 11. The sleeve 50, in extending or projecting outward of the other parts of the joint and of the drill stem sections, engages, or occasionally rubs, the walls of the casing in which the drill stem is operating and is thereby caused to tighten on the socket part 15.

From the foregoing description it will be understood how two drill stem sections may be easily and quickly connected without rotation of either of them and how the connection between the drill stem sections may be broken at any time by disengaging the sleeve 50 from the socket part 15. Releasement of the coupling, that is, disengagement of the sleeve 50 from the socket part 15, may be effected at the derrick of the well or may be effected in the well by the aid of suitable tools. Further, it may be pointed out that the lug 17 co-operates with socket 23 not only to form a driving connection between the parts 14 and 15, and therefore the drill stem sections, but also to bring the parts 14 and 15 into perfect alignment so that the sleeve 50 can be readily slid downwardly over the part 14 and screw threaded onto the part 15.

Having described only a preferred form of our invention we do not wish to limit ourselves to the particular details hereinabove set forth, but wish to reserve to ourselves any changes or variations that may appear to those skilled in the art or that may fall within the scope of the following claims.

Having described a preferred form of our invention, we claim:

1. A device for connecting two members comprising, two parts, one screw threaded on the end of each member, and a sleeve for connecting said parts the sleeve having screw threaded engagement with one of said parts, the screw threaded engagements between the members and parts being alike and opposite to that between the sleeve and the part.

2. A device for connecting two members comprising, two abutting parts cooperating so that they can not be rotated relative to each other when together, one screw threaded on the end of each member, and a sleeve for holding said parts together the sleeve having screw threaded engagement with one of said parts, the screw threaded engagements between the members and parts being alike and opposite to that between the sleeve and the part.

3. A device for connecting two members having openings through them comprising two parts, one screw-threaded on the end of each member, a central socket in one of the parts, a central lug on the other part adapted to cooperate with the socket to prevent relative rotary movement between the parts, the parts having registering openings through them, and a sleeve for connecting said parts, the sleeve having screw threaded engagement with one of the parts, the screw-threaded engagements between the members and parts being alike and opposite to that between the sleeve and the part.

In witness that we claim the foregoing we have hereunto subscribed our names this 13th day of July 1921.

ADOLPH RICKENBACKER.
WILLIAM KAMMERER.

Witness:
VIRGINIA BERINGER.